(12) United States Patent
Hou et al.

(10) Patent No.: US 9,294,160 B2
(45) Date of Patent: Mar. 22, 2016

(54) METHOD AND APPARATUS FOR SUPPORTING DISTRIBUTED MIMO IN A WIRELESS COMMUNICATION SYSTEM

(75) Inventors: Jilei Hou, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 672 days.

(21) Appl. No.: 12/535,972

(22) Filed: Aug. 5, 2009

(65) Prior Publication Data
US 2010/0035627 A1 Feb. 11, 2010

Related U.S. Application Data

(60) Provisional application No. 61/087,922, filed on Aug. 11, 2008.

(51) Int. Cl.
*H04B 1/00* (2006.01)
*H04B 15/00* (2006.01)
(Continued)

(52) U.S. Cl.
CPC .............. *H04B 7/024* (2013.01); *H04B 7/0452* (2013.01); *H04B 7/0626* (2013.01); *H04B 7/0632* (2013.01)

(58) Field of Classification Search
CPC ..... H04B 7/024; H04B 7/0452; H04B 7/0632
USPC ....................................................... 455/452.2
See application file for complete search history.

(56) References Cited

U.S. PATENT DOCUMENTS 8,140,098 B2 3/2012 Gorokhov
8,208,364 B2 6/2012 Walton et al.
(Continued)

FOREIGN PATENT DOCUMENTS

CN 1787400 A 6/2006
CN 101095296 A 12/2007
(Continued)

OTHER PUBLICATIONS

Alcatel Shanghai Bell, et al., "Collaborative MIMO for LTE-A downlink," 3GPP Draft TSG RAN WG1 Meeting #53bis; R1-082501_DL Collaborative MIMO, 3RD Generation Partnership Project (3GPP), Warsaw, Poland; (Jun. 30, 2008), XP050110769, the whole document.
(Continued)

*Primary Examiner* — Ayodeji Ayotunde
(74) *Attorney, Agent, or Firm* — Tyler J. Overall

(57) ABSTRACT

Techniques for supporting distributed MIMO are described. For multi-user distributed MIMO, a cell directs its transmit power toward a UE while reducing interference to UE(s) in neighbor cell(s). For single-user distributed MIMO, multiple cells concurrently send transmissions to a UE. In an aspect, a UE sends channel estimates for serving and non-serving cells to support multi-user distributed MIMO. Each cell may use the channel estimates to select UEs for data transmission and determine precoding vectors to use for data transmission to the selected UEs. In another aspect, a UE sends CQI information for serving and non-serving cells to support single-user distributed MIMO. Each cell may use the CQI information to select UEs for data transmission and determine modulation and coding schemes to use for the selected UEs. In yet another aspect, a UE determines CQI information for a serving cell by taking into account interference nulling by non-serving cells.

28 Claims, 9 Drawing Sheets

(51) Int. Cl.
*H04B 7/02* (2006.01)
*H04B 7/04* (2006.01)
*H04W 72/00* (2009.01)
*H04B 7/06* (2006.01)

(56) References Cited

U.S. PATENT DOCUMENTS

| | | | |
|---|---|---|---|
| 2002/0115464 A1* | 8/2002 | Hwang et al. | 455/522 |
| 2003/0043732 A1* | 3/2003 | Walton et al. | 370/208 |
| 2003/0125040 A1* | 7/2003 | Walton et al. | 455/454 |
| 2004/0176097 A1* | 9/2004 | Wilson et al. | 455/452.2 |
| 2005/0101259 A1 | 5/2005 | Tong et al. | |
| 2005/0152387 A1* | 7/2005 | Utsunomiya et al. | |
| 2006/0007889 A1* | 1/2006 | Khan | 370/331 |
| 2006/0012477 A1 | 1/2006 | Woodall et al. | |
| 2006/0104142 A1 | 5/2006 | Gilton | |
| 2006/0120477 A1 | 6/2006 | Shen et al. | |
| 2006/0291371 A1* | 12/2006 | Sutivong et al. | 370/208 |
| 2007/0008933 A1 | 1/2007 | Braun et al. | |
| 2007/0026810 A1* | 2/2007 | Love et al. | 455/67.11 |
| 2007/0097856 A1* | 5/2007 | Wang et al. | 370/210 |
| 2007/0196072 A1* | 8/2007 | Zhou et al. | 385/147 |
| 2007/0281746 A1* | 12/2007 | Takano et al. | 455/562.1 |
| 2008/0037671 A1 | 2/2008 | Lee et al. | |
| 2008/0096488 A1 | 4/2008 | Cho et al. | |
| 2008/0253490 A1 | 10/2008 | Hafeez | |
| 2009/0016425 A1* | 1/2009 | Hui et al. | 375/240 |
| 2009/0185631 A1 | 7/2009 | Choi et al. | |
| 2009/0323773 A1* | 12/2009 | Bala | H04B 7/0665 375/141 |
| 2010/0034146 A1 | 2/2010 | Hou et al. | |

FOREIGN PATENT DOCUMENTS

| | | |
|---|---|---|
| EP | 1206047 A2 | 5/2002 |
| EP | 1887712 A2 | 2/2008 |
| JP | 2002232353 A | 8/2002 |
| JP | 2003304577 A | 10/2003 |
| JP | 2005198213 A | 7/2005 |
| JP | 2008048403 A | 2/2008 |
| JP | 2008523665 A | 7/2008 |
| JP | 2009159585 A | 7/2009 |
| JP | 2011509571 A | 3/2011 |
| JP | 2012510233 A | 4/2012 |
| KR | 20070068300 A | 6/2007 |
| KR | 20080009071 A | 1/2008 |
| KR | 20080014213 A | 2/2008 |
| RU | 2209526 C2 | 7/2003 |
| RU | 2232472 C2 | 7/2004 |
| WO | WO-2006063138 A2 | 6/2006 |
| WO | WO-2006108703 A1 | 10/2006 |
| WO | WO2007033997 A1 | 3/2007 |
| WO | WO-2007043459 A1 | 4/2007 |
| WO | WO-2007051208 A2 | 5/2007 |
| WO | WO-2007067107 A1 | 6/2007 |
| WO | WO-2007108080 A1 | 9/2007 |
| WO | WO-2009084921 A2 | 7/2009 |
| WO | WO-2010016607 A1 | 2/2010 |
| WO | WO-2010017482 A1 | 2/2010 |
| WO | WO-2010068374 A1 | 6/2010 |

OTHER PUBLICATIONS

Alcatel-Lucent: "Collaborative MIMO" IEEE C802.16M-07/244R1, [Online] pp. 1-9, XP002559332 Jul. 11, 2007 Retrieved from the Internet: URL: http://wirelessman.org/tgm/index-older.html>.

International Search Report and Written Opinion—PCT/US2009/053016, International Search Authority—European Patent Office—Mar. 15, 2010.

Kim Jee Hyun et al: "Efficient Feedback via Subspace-Based Channel Quantization for Distributed Cooperative Antenna Systems with Temporally Correlated Channels" EURASIP Journal on Advances in Signal Processing, Hindawi Publishing Corp, US, vol. 2008, Dec. 1, 2007, pp. 1-13, XP002527506 ISSN: 1687-6172.

M. Karakayali, G. Foschini and R. Valenzuela, "Network Coordination for spectrally efficient Communications in Cellular Systems", Aug. 2006, IEEE Wireless Communications Magazine pp. 56-61.

NTT Docomo et al: "Downlink MIMO Scheme for Shared Data Channel in E-UTRA" 3GPP Draft; R1-063310 DL MIMO Scheme, 3RD Generation Partnership Project (3GPP), Mobile Competence Centre; 650, Route Des Lucioles; F-06921 Sophia-Antipolis Cedex ; France, vol. RAN WG1, No. Riga, Latvia; 20061102, Nov. 2, 2006, XP050103755.

Alcatel-Lucent, "LTE-IMT advanced-Candidate Technologies", 3GPP TSG-RAN WG1#53, R1-081877, May, 2008, 20 Pages.

Samsung: "Future 3GPP Radio Technologies for LTE-Advanced", 3GPP TSG-RAN WG1#53, R1-081722, May 14, 2008, 19 Pages, URL: http://www.3gpp.org/ftp/tsg_ran/WG1_RL1/TSGR1_53/Docs/R1-081722.zip.

Samsung: "Inter-cell Interference Management and Network MIMO", 3GPP TSG-RAN WG1#53b R1-082325, Jun. 24, 1008, 4 Pages, URL: http://www.3gpp.org/ftp/tsg_ran/WG1_RL1/TSGR1_53b/Docs/R1-082325.zip.

* cited by examiner

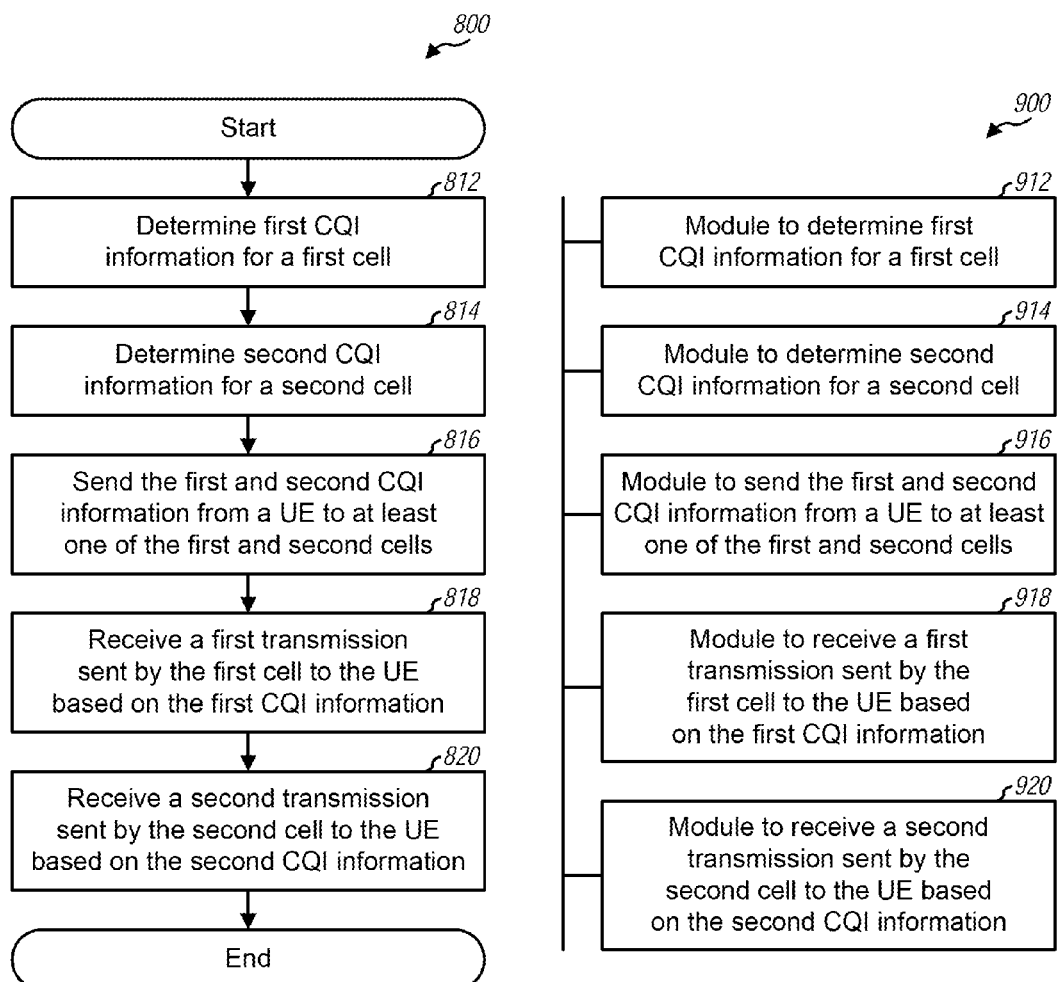

METHOD AND APPARATUS FOR SUPPORTING DISTRIBUTED MIMO IN A WIRELESS COMMUNICATION SYSTEM

The present application claims priority to provisional U.S. Application Ser. No. 61/087,922, entitled "METHOD AND APPARATUS FOR SUPPORTING DISTRIBUTED MIMO IN A WIRELESS COMMUNICATION SYSTEM," filed Aug. 11, 2008, assigned to the assignee hereof and incorporated herein by reference.

BACKGROUND

I. Field

The present disclosure relates generally to communication, and more specifically to techniques for supporting data transmission in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system (e.g., a cellular system) may include a number of Node Bs that can support communication for a number of user equipments (UEs). A UE may communicate with a Node B via the downlink and uplink. The downlink (or forward link) refers to the communication link from the Node B to the UE, and the uplink (or reverse link) refers to the communication link from the UE to the Node B.

A UE may be within the coverage of multiple cells, where the term "cell" can refer to a coverage area of a Node B and/or a Node B subsystem serving the coverage area. One cell may be selected as a serving cell for the UE, and the remaining cells may be referred to as non-serving cells. The UE may observe strong interference from the non-serving cells. It may be desirable to send data to the UE in a manner to achieve good performance even in the presence of strong non-serving cells.

SUMMARY

Techniques for supporting single-user and multi-user distributed multiple-input multiple-output (MIMO) transmissions are described herein. In one design of multi-user distributed MIMO, a cell may send a transmission to a UE such that the transmit power of the cell is directed toward the UE while reducing interference to one or more other UEs in one or more neighbor cells. In one design of single-user distributed MIMO, multiple cells may concurrently send transmissions to a UE.

In an aspect, a UE may send channel estimates for its serving cell as well as one or more non-serving cells to support multi-user distributed MIMO. Each cell may receive channel estimates from UEs served by that cell as well as UEs in neighbor cells. Each cell may use the channel estimates for all UEs to (i) select UEs for data transmission by that cell and (ii) to determine precoding vectors to use for data transmission to the selected UEs such that interference is reduced to UEs in neighbor cells.

In one design, a UE may determine a first channel estimate for a first cell (e.g., a serving cell), determine a second channel estimate for a second cell (e.g., a non-serving cell), and determine channel quality indicator (CQI) information for the first cell. The UE may send feedback information comprising the first and second channel estimates and CQI information. The UE may thereafter receive a first transmission sent by the first cell to the UE based on the first channel estimate and the CQI information. The UE may also receive a second transmission sent by the second cell to another UE based on the second channel estimate to reduce interference to the UE.

In another aspect, a UE may send CQI information for its serving cell as well as one or more non-serving cells to support single-user distributed MIMO. Each cell may receive CQI information from UEs served by that cell as well as UEs in neighbor cells. Each cell may use the CQI information for all UEs to (i) select UEs for data transmission by that cell and (ii) to determine modulation and coding schemes to use for data transmission to the selected UEs.

In one design, a UE may determine first CQI information for a first cell, determine second CQI information for a second cell, and send feedback information comprising the first and second CQI information. The UE may thereafter receive a first transmission sent by the first cell to the UE based on the first CQI information. The UE may also receive a second transmission sent by the second cell to the UE based on the second CQI information. The first and second transmissions may be sent concurrently on resources not used by the first and second cells for other UEs.

In yet another aspect, a UE may determine CQI information for a serving cell by taking into account interference nulling by one or more non-serving cells. A non-serving cell may perform beamsteering based on a channel estimate received from the UE to null or reduce interference to the UE. The UE may then observe less interference from the non-serving cell and may be able to achieve a higher signal-to-noise-and-interference (SINR) ratio. The UE may thus take into account the lower interference from each non-serving cell performing interference nulling when estimating SINR. This may result in more accurate CQI information for data transmission from the serving cell to the UE.

In one design, a UE may estimate SINR for a first cell by taking into account lower interference from a second cell performing beamsteering to reduce interference to the UE. The UE may determine CQI information based on the estimated SINR and may send the CQI information to the first cell. The UE may thereafter receive a transmission sent by the first cell to the UE based on the CQI information.

Various aspects and features of the disclosure are described in further detail below.

BRIEF DESCRIPTION OF THE DRAWINGS

FIGS. 8 and 9 show a process and an apparatus, respectively, for receiving data with single-user distributed MIMO.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies given above as well as other systems and radio technologies. For clarity, certain aspects of the techniques are described below for LTE.

Figure 1:
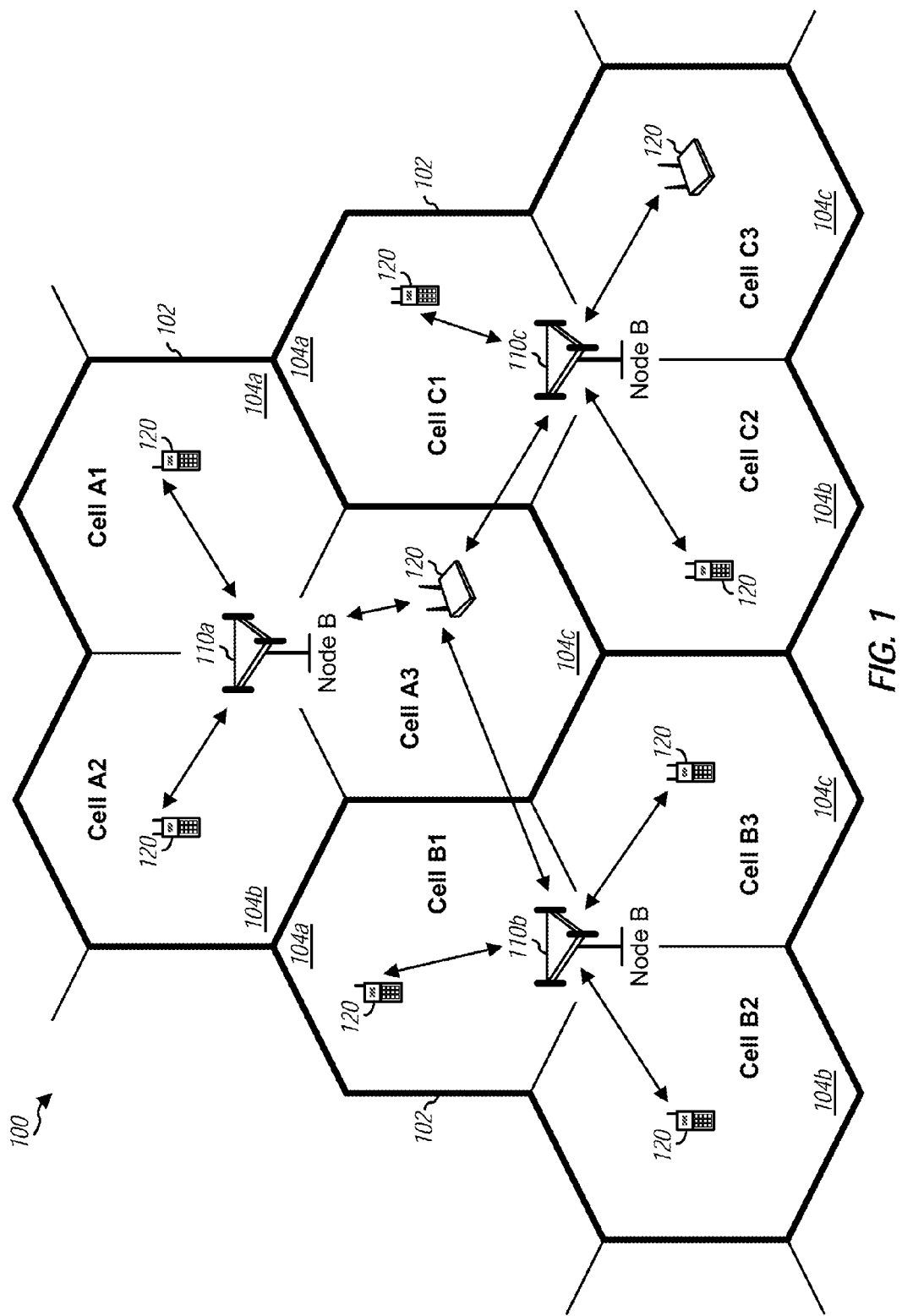
FIG. 1 shows a wireless communication system.

FIG. 1 shows a wireless communication system 100, which may be a cellular system such as an LTE system or some other system. System 100 may include a number of Node Bs and other network entities that can support communication services for a number of UEs. For simplicity, only three Node Bs 110a, 110b and 110c are shown in FIG. 1. A Node B is a station that communicates with the UEs and may also be referred to as an evolved Node B (eNB), a base station, an access point, etc. Each Node B 110 provides communication coverage for a particular geographic area 102. To improve system capacity, the overall coverage area of a Node B may be partitioned into multiple smaller areas, e.g., three smaller areas 104a, 104b and 104c. Each smaller area may be served by a respective Node B subsystem. In 3GPP, the term "cell" can refer to the smallest coverage area of a Node B and/or a Node B subsystem serving this coverage area. In 3GPP2, the term "sector" or "cell-sector" can refer to the smallest coverage area of a base station and/or a base station subsystem serving this coverage area. For clarity, 3GPP concept of cell is used in the description below. In general, a Node B may support one or multiple (e.g., three) cells.

A number of UEs may be dispersed throughout the system, and each UE may be stationary or mobile. For simplicity, FIG. 1 shows only one UE 120 in each cell. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. The terms "UE" and "user" are used interchangeably herein.

In system 100, some UEs may be located at the boundary of neighbor cells and may be referred to as cell-edge UEs. The cell-edge UEs may observe high inter-cell interference, which may adversely impact performance. Several schemes may be used to exploit spatial dimension to improve the performance of the cell-edge UEs. For example, the following schemes may be used:

Multi-user distributed MIMO—send data transmission from a serving cell to a UE with beamsteering to reduce interference to one or more UEs in one or more other cells, and Single-user distributed MIMO—send data transmissions from multiple cells to a UE so that interference power from a non-serving cell (e.g., a cooperating cell) is translated into desired power at the UE.

Beamsteering is a process to control the spatial direction of a transmission toward a target receiver and/or away from an unintended receiver. Beamsteering may be performed by applying a precoding vector to the transmission at a transmitter, as described below.

Figure 2:
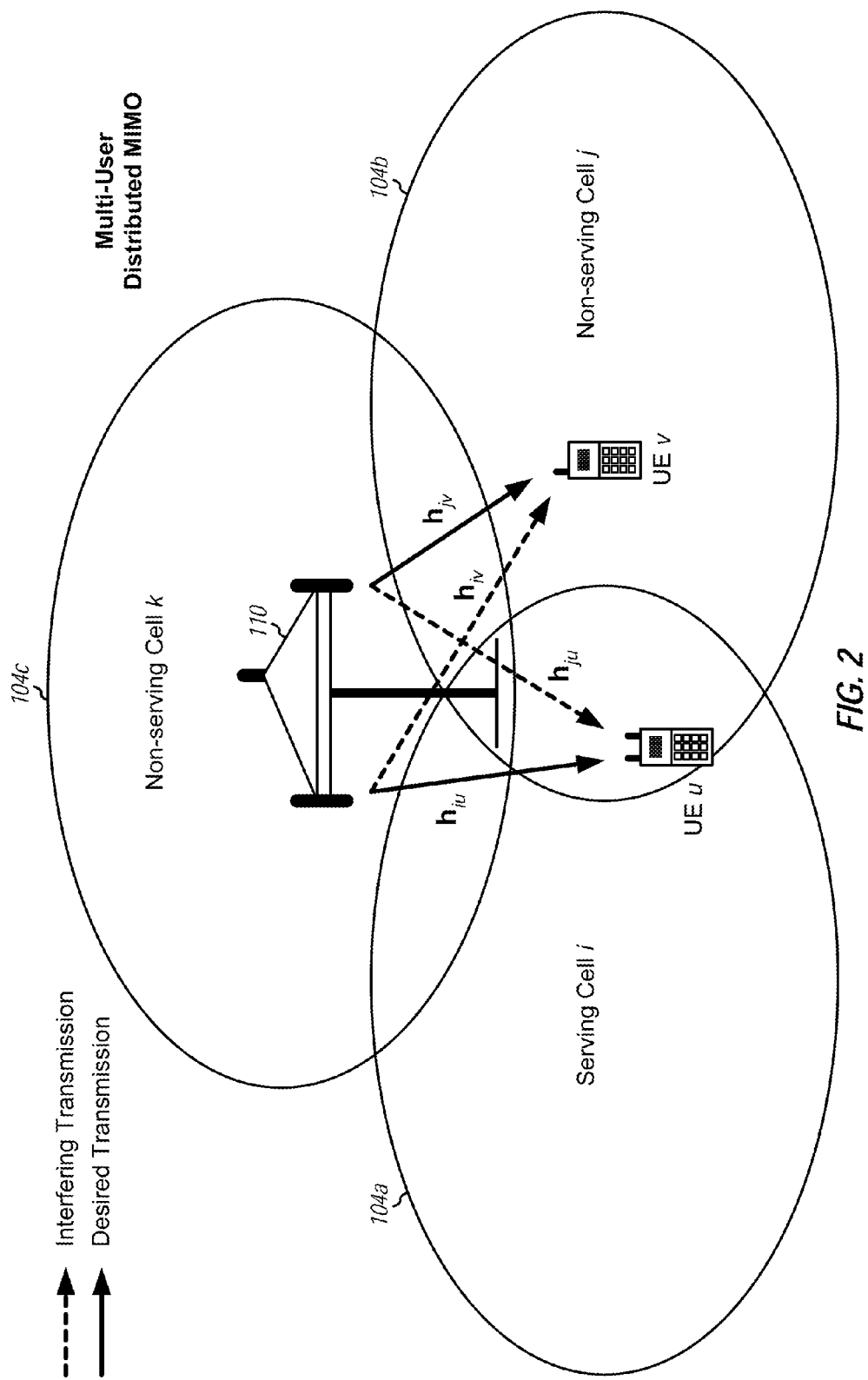
FIG. 2 shows downlink transmission for multi-user distributed MIMO.

FIG. 2 shows downlink transmission with multi-user distributed MIMO for one Node B with three cells i, j and k covering different geographic areas. The adjacent cells typically overlap one another at the edges, which may allow a UE to receive communication coverage from one or more cells at any location as the UE moves about the system. For simplicity, FIG. 2 shows only two UEs u and v. UE u is a cell-edge UE located at the boundary of cells i and j. Cell i may be selected as a serving cell for UE u, and cell j may be a non-serving cell for UE u. UE v is located within cell j. Cell j may be a serving cell for UE v, and cell i may be a non-serving cell for UE v. In general, a UE may be located within the coverage of any number of cells and may have any number of non-serving cells.

For multi-user distributed MIMO, each cell may transmit data to one or more UEs in that cell while reducing interference to one or more UEs in one or more neighbor cells. For example, cell i may transmit data to UE u while reducing interference to UE v in neighbor cell j. Similarly, cell j may transmit data to UE v while reducing interference to UE u in neighbor cell i. In general, each cell may form spatial beams directed toward its UEs while nulling or reducing interference to UEs in neighbor cells. The UEs in the neighbor cells may then observe less inter-cell interference.

Figure 3:
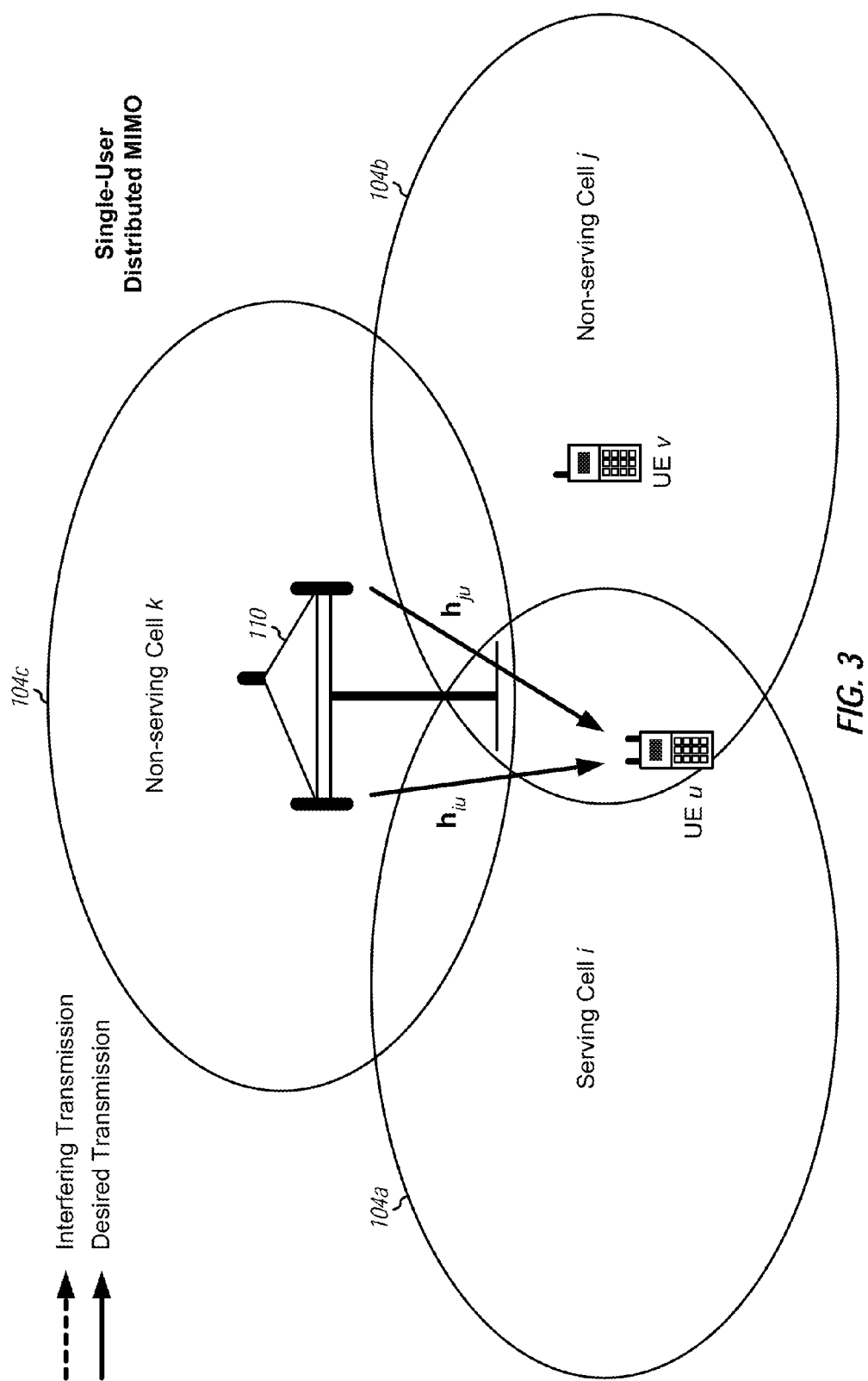
FIG. 3 shows downlink transmission for single-user distributed MIMO.

FIG. 3 shows downlink transmission with single-user distributed MIMO for one Node B with three cells i, j and k. For single-user distributed MIMO, multiple cells may concurrently send different data streams to the same UE. For example, cell i may send one data stream to UE u, and cell j may send another data stream to UE u. The received power for both cells i and j at UE u would then be desired power (instead of just serving cell i providing desired power and non-serving cell j providing interference power).

In an aspect, to support single-user and multi-user distributed MIMO as well as other schemes exploiting spatial dimensions, a UE may estimate and send back channel estimates for its serving cell as well as one or more non-serving cells. A channel estimate for a cell may comprise complex channel gains and may also be referred to as channel direction indicator (CDI) information. The UE may also estimate and send back CQI information for each cell sending data to the UE. The CQI information may comprise an SINR, a modulation and coding scheme (MCS), or equivalent information. In general, feedback information for each cell may include CDI information, CQI information, other information, or any combination thereof. The CDI and/or CQI information may be wideband and applicable for the entire system bandwidth. Alternatively, the system bandwidth may be partitioned into multiple subbands, and the CDI and/or CQI information may be given for each subband of interest.

For simplicity, much of the description below is for data transmission to UE u, which may have one serving cell i and one or more non-serving cells with index j. For multi-user distributed MIMO, serving cell i may transmit data to UE u, and non-serving cell j may perform interference nulling for UE u. For single-user distributed MIMO, both serving cell i and non-serving cell j may transmit data to UE u.

For multi-user distributed MIMO, e.g., as shown in FIG. 2, UE u may send back CDI and CQI information for serving cell i for data transmission to UE u as well as CDI information for one or more non-serving cells, e.g., for each non-serving cell causing strong interference to UE u. Each non-serving cell may use the CDI information to reduce interference to UE u.

UE u may determine CDI information for serving cell i as follows. UE u may first obtain a channel estimate for serving cell i, e.g., based on a reference signal or pilot received from the serving cell. If UE u is equipped with a single antenna, then the channel estimate may be given by a 1×T channel response row vector $h_{iu}$, where T is the number of antennas for serving cell i. Vector $h_{iu}$ may include T elements, with each element corresponding to one complex channel gain for one antenna for serving cell i. UE u may divide the channel response vector by its magnitude to obtain a unit norm vector, as follows:

$$\tilde{h}_{iu} = \frac{h_{iu}}{\|h_{iu}\|}, \quad \text{Eq (1)}$$

where $\|h_{iu}\|$ is the magnitude of the channel response vector $h_{iu}$, and $\tilde{h}_{iu}$ is a normalized channel response vector with unit magnitude for serving cell i.

Many bits may be needed to send individual elements of vector $\tilde{h}_{iu}$ as CDI information. In one design, to reduce the amount of CDI information to send back, a codebook containing $2^B$ channel vectors may be defined. The $2^B$ channel vectors in the codebook may be independently chosen from an isotropic distribution on a B-dimensional unit sphere. Each channel vector may be referred to as a codeword of the codebook and may be assigned a unique B-bit index. In one design, B=4, the codebook contains 16 channel vectors, and each channel vector may be assigned a unique 4-bit index. Other values of B may also be used. In any case, UE u may select a channel vector from the codebook that most closely matches vector $\tilde{h}_{iu}$. The selected channel vector may be denoted as $\hat{h}_{iu}$.

UE u may send the B-bit index of the selected channel vector $\hat{h}_{iu}$ as CDI information to serving cell i. Serving cell i may also receive CDI information from other UEs in the cell as well as UEs in neighbor cells. For example, serving cell i may receive CDI information comprising a selected channel vector $\hat{h}_{iv}$ from UE v in non-serving cell j. Serving cell i may use the CDI information from all UEs for (i) user selection to determine which UEs to serve and (ii) beam selection to determine precoding vectors to use for data transmission to the selected UEs. For example, serving cell i may decide to serve UE u and may desire to null interference to UE v. Serving cell i may determine a precoding vector $w_i$ such that (i) $w_i$ matches $\hat{h}_{iu}$ as much as possible in order to maximize the desired power to UE u and (ii) $w_i$ is as orthogonal to $\hat{h}_{iv}$ as possible in order to minimize interference power to UE v. Precoding vector $w_i$ may be selected based on a tradeoff between factors (i) and (ii) and possibly other factors.

In one design, serving cell i may send a data stream to UE u and may perform beamsteering/precoding for the data stream with precoding vector $w_i$, as follows:

$$x_i = w_i \cdot d_i, \quad \text{Eq (2)}$$

where $d_i$ denotes the data stream sent by serving cell i, and $x_i$ is a vector of output symbols sent by serving cell i.

UE u may determine CDI information for non-serving cell j as follows. UE u may first obtain a channel estimate for non-serving cell j, e.g., based on a reference signal or pilot received from the non-serving cell. The channel estimate may be given by a channel response vector $h_{ju}$. UE u may divide the channel response vector by its magnitude to obtain a unit norm vector, as follows:

$$\tilde{h}_{ju} = \frac{h_{ju}}{\|h_{ju}\|}, \quad \text{Eq (3)}$$

where $\tilde{h}_{ju}$ is a normalized channel response vector for non-serving cell j.

In one design, a codebook containing $2^L$ channel vectors independently chosen from an isotropic distribution on an L-dimensional unit sphere may be defined. Each channel vector may be assigned a unique L-bit index. In general, B and L for the codebooks for the serving and non-serving cells may be chosen such that L≥B. However, since good performance for interference nulling may be dependent on an accurate channel estimate for each non-serving cell of interest, it may be desirable to have L>B. In one design, L=6, the codebook for the non-serving cell contains 64 channel vectors, and each channel vector may be assigned a unique 6-bit index. Other values of L may also be used. In any case, UE u may select a channel vector from the codebook that most closely matches vector $\tilde{h}_{ju}$. The selected channel vector may be denoted as $\hat{h}_{ju}$.

UE u may send the L-bit index of the selected channel vector $\hat{h}_{ju}$ as CDI information for non-serving cell j. In one design, UE u may send the CDI information to serving cell i, which may forward the CDI information to non-serving cell j via a suitable interference. This design may improve reliability of the CDI feedback since UE u may have a better link to serving cell i than non-serving cell j. In another design, UE u may send the CDI information directly to non-serving cell j. For both designs, non-serving cell j may use the CDI information from UE u as well as CDI information from other UEs for both user selection and beam selection, in similar manner as serving cell i. For example, non-serving cell j may decide to serve UE v and may desire to null interference to UE u. Non-serving cell j may determine a precoding vector $w_j$ such that (i) $w_j$ matches a selected channel vector $\hat{h}_{jv}$ for UE v as much as possible in order to maximize the desired power to UE v and (ii) $w_j$ is as orthogonal to $\hat{h}_{ju}$ as possible in order to minimize interference power to UE u.

In one design, non-serving cell j may perform beamsteering/precoding for its data stream with precoding vector $w_j$, as follows:

$$x_j = w_j \cdot d_j, \quad \text{Eq (4)}$$

where $d_j$ denotes a data stream sent by non-serving cell j, and $x_j$ is a vector of output symbols sent by non-serving cell j.

UE u may receive downlink transmissions from serving cell i and non-serving cell j. The received signal at UE u may be expressed as:

$$R_u = h_{iu}x_i + \sum_{j \neq i} h_{ju}x_j + N_u = h_{iu}w_i d_i + \sum_{j \neq i} h_{ju}w_j d_j + N_u, \quad \text{Eq (5)}$$

where $R_u$ is the received signal at UE u, and $N_u$ is the noise observed by UE u.

In equation (5), the summation may be present if there are multiple non-serving cells and may be omitted if there is only one non-serving cell.

UE u may utilize various equalization techniques to process the received signal and recover the data stream sent by serving cell i to UE u. These equalization techniques may include zero-forcing (ZF), linear minimum mean square error (MMSE), maximum likelihood detector (MLD), etc. The SINR at UE u may be dependent on the particular equalization technique utilized by UE u.

UE u may determine CQI information for serving cell i as follows. UE u may estimate SINR for serving cell i, e.g., based on reference signals received from serving cell i and non-serving cell j. The SINR may be expressed as:

$$SINR_u = \frac{P_i \cdot |h_{iu}w_i|^2}{N_u + \sum_{j \neq i} P_j \cdot |h_{ju}w_j|^2} = \frac{P_i \cdot \|h_{iu}\|^2 \cdot |\tilde{h}_{iu}w_i|^2}{N_u + \sum_{j \neq i} P_j \cdot \|h_{ju}\|^2 \cdot |\tilde{h}_{ju}w_j|^2}, \quad \text{Eq (6)}$$

where $P_i$ and $P_j$ are transmit power of cells i and j, respectively, and $SINR_u$ is the SINR at UE u.

In equation (6), the numerator includes the desired power from serving cell i. The denominator includes the noise $N_u$ observed by UE u as well as interference power from non-serving cell j.

In an aspect, the SINR at UE u may be estimated by taking into account interference nulling by non-serving cell j. Non-serving cell j may perform beamsteering in order to reduce interference to UE u. Complete interference nulling may be achieved if $w_j$ is orthogonal to $h_{ju}$, so that $|h_{ju}w_j|=0$ in the denominator of equation (6). The amount of interference power observed by UE u may be dependent on the effectiveness of the interference nulling by non-serving cell j. The effectiveness of the interference nulling may, in turn, be dependent on (i) how closely the selected channel vector $\hat{h}_{ju}$ matches the channel response vector $h_{ju}$ and (ii) the selection of preceding vector $w_j$ based on the selected channel vector $\hat{h}_{ju}$.

The accuracy between a selected channel vector and an actual channel response vector may be given by a quantization error. The quantization errors for serving cell i and non-serving cell j may be defined as follows:

$$\cos\theta_{iu} = |\tilde{h}_{iu}\hat{h}_{iu}^H| \text{ and } \cos\theta_{ju} = |\tilde{h}_{ju}\hat{h}_{ju}^H|, \quad (7)$$

where $\cos\theta_{iu}$ is the quantization error in mapping $\tilde{h}_{iu}$ to $\hat{h}_{iu}$, $\cos\theta_{ju}$ is the quantization error in mapping $\tilde{h}_{ju}$ to $\hat{h}_{ju}$, and "H" denotes a Hermitian or conjugate transpose.

In a first design of estimating SINR, complete interference nulling by non-serving cell j may be assumed. The quantization error in mapping $\tilde{h}_{ju}$ to $\hat{h}_{ju}$ may be ignored, so that $\hat{h}_{ju} \approx \tilde{h}_{ju}$. Furthermore, preceding vector $w_j$ may be assumed to be orthogonal to the selected channel vector, so that $|\hat{h}_{ju}w_j|=0$. From equation (6), the SINR at UE u may then be estimated as follows:

$$SINR_u = \frac{P_i \cdot \|h_{iu}\|^2 \cdot |\tilde{h}_{iu}w_i|^2}{N_u}. \quad \text{Eq (8)}$$

UEs u and v may be spatially orthogonal (or close to it) and may be selected because of this fact. In this case, serving cell i may select its preceding vector as $w_i \approx \hat{h}_{iu}^H$. The SINR at UE u may then be estimated as follows:

$$SINR_u = \frac{P_i \cdot \|h_{iu}\|^2 \cos\theta_{iu}}{N_u}. \quad \text{Eq (9)}$$

As shown in equations (8) and (9), the first SINR estimation design assumes complete interference nulling by non-serving cell A. Hence, the denominator of equations (8) and (9) contains only the noise $N_u$ observed by UE u and no interference from non-serving cell j. This design may provide an optimistic estimate of SINR, which may be accounted for in several manners. In one design, a backoff factor or margin may be used in mapping the estimated SINR to CQI information. In another design, the optimistic estimate of SINR may be accounted for by HARQ.

In a second design of estimating SINR, partial interference nulling by non-serving cell j may be assumed, and residual interference power may be taken into account in estimating SINR. For the second design, an error term $e_{ju}$ that is orthogonal to $\hat{h}_{ju}$ may be defined as follows:

$$e_{ju} = \tilde{h}_{ju} - (\tilde{h}_{ju}\hat{h}_{ju}^H)\hat{h}_{ju}, \text{ and} \quad \text{Eq (10)}$$

$$\sin^2\theta_{ju} = \|e_{ju}\|^2. \quad \text{Eq (11)}$$

The term $|\tilde{h}_{ju}w_j|^2$ in the denominator of equation (6) may be expressed as:

$$\begin{aligned}|\tilde{h}_{ju}w_j|^2 &= \left|\left((\tilde{h}_{ju}\hat{h}_{ju}^H)\hat{h}_{ju} + e_{ju}\right)w_j\right|^2 \\ &= |e_{ju}w_j|^2 \\ &= \|e_{ju}\|^2 |\tilde{e}_{ju}w_j|^2 \\ &\approx \sin^2\theta_{ju} \cdot \frac{1}{M-1}\end{aligned} \quad \text{Eq (12)}$$

where $M=2^L$ is the size of the codebook for non-serving cell j.

The term $|\tilde{h}_{iu}w_i|^2$ in the numerator of equation (6) may be expressed as:

$$|\tilde{h}_{iu}w_i|^2 = |(\tilde{h}_{iu}\hat{h}_{iu}^H)\hat{h}_{iu}w_i|^2 = \cos^2\theta_{iu} \cdot |\hat{h}_{iu}w_i|^2 \approx \cos^2\theta_{iu}. \quad \text{Eq (13)}$$

Equation (13) assumes that $w_i \approx \hat{h}_{iu}^H$, so that $|\hat{h}_{iu}w_i|^2 \approx 1$.

The SINR at UE u may be estimated as follows:

$$SINR_u \approx \frac{P_i \cdot \|h_{iu}\|^2 \cos^2\theta_{iu}}{N_u + \frac{1}{M-1} \cdot \sum_{j \neq i} P_j \cdot \|h_{ju}\|^2 \sin^2\theta_{ju}}. \quad \text{Eq (14)}$$

For the second SINR estimation design, the Node B for cells i and j may determine preceding vectors for these cells. The Node B may post multiply the term $|\hat{h}_{iu}w_i|^2$ to the SINR reported by UE u to obtain an adjusted SINR.

UE u may obtain an estimated $SINR_u$ based on one of the SINR estimation designs described above or some other design. UE u may generate CQI information based on the estimated $SINR_u$. In one design, the estimated $SINR_u$ may be quantized to a K-bit value, which may be provided as CQI information. K may be equal to four or some other suitable value. In another design, a table of up to $2^K$ MCSs may be defined. Each MCS may be associated with a particular required SINR and may be assigned a unique K-bit index. The estimated $SINR_u$ may be mapped to one of the MCSs in the table, and the K-bit index of the selected MCS may be provided as CQI information. $SINR_u$ may also be mapped to CQI information in other manners.

The description above assumes that UE u is equipped with a single antenna. If UE u is equipped with multiple antennas, then the response of a MIMO channel from serving cell i to UE u may be given by an R×T channel response matrix $H_{iu}$. The channel estimate for serving cell i may be an equivalent channel response vector, which may be dependent on the MIMO detection technique utilized by UE u.

In one design, singular value decomposition of the channel response matrix $H_{iu}$ may be expressed as:

$$H_{iu} = U_{iu} \Lambda_{iu} V_{iu}^H, \qquad \text{Eq (15)}$$

where $U_{iu}$ is an R×R unitary matrix of left singular vectors of $H_{iu}$, $\Lambda_{iu}$ is an R×T diagonal matrix of singular values of $H_{iu}$, and $V_{iu}$ is a T×T unitary matrix of right singular vectors of $H_{iu}$.

A unitary matrix U is characterized by the property $U^H U = I$, where I is the identity matrix. The columns of U are orthogonal to one another, and each column has unit power. The diagonal elements of $\Lambda_{iu}$ are singular values that represent the channel gains of the eigenmodes of $H_{iu}$.

The singular values in $\Lambda_{iu}$ may be ordered from largest to smallest along the diagonal. The vectors in $U_{iu}$ and $V_{iu}$ may be ordered in the same way as the singular values in $\Lambda_{iu}$. After ordering, the first column of $U_{iu}$ is the dominant left singular vector and may be denoted as $u_{i,1}$. The first column of $V_{iu}$ is the dominant right singular vector and may be denoted as $v_{i,1}$.

In one design, the channel estimate for serving cell i may be given by a channel response vector defined as follows:

$$h_{iu} = u_{i,1}^H H_{iu} = \lambda_{i,1} v_{i,1}^H, \qquad \text{Eq (16)}$$

where $\lambda_{i,1}$ is the largest singular value in $\Lambda_{iu}$.

For the design shown in equation (16), UE u may be assumed to perform MIMO detection (or receive filtering) by pre-multiplying its received signals with a receive filter vector $u_{i,1}$. $h_{iu}$ may then be an equivalent channel defined by a scaled version of the dominant right singular vector. $h_{iu}$ may be mapped to a channel vector $\hat{h}_{iu}$, which may be provided as CDI information for serving cell i.

In one design, the channel estimate for non-serving cell j may be given by a channel response vector defined as follows:

$$h_{ju} = u_{i,1}^H H_{ju}, \qquad \text{Eq (17)}$$

where $H_{ju}$ is a channel response matrix for non-serving cell j.

In the design shown in equation (17), channel response vector $h_{ju}$ for non-serving cell j may be obtained by applying the same receive filter vector $u_{i,1}$ to channel response matrix $H_{ju}$ for non-serving cell j. $h_{ju}$ may be mapped to a channel vector $\hat{h}_{ju}$, which may be provided as CDI information for non-serving cell j.

For single-user distributed MIMO, e.g., as shown in FIG. 3, UE u may receive multiple data streams from multiple cells on resources reserved for UE u. For example, cells i and j may send two data streams on a resource block to UE u, and no other UEs in cells i and j may be scheduled on this resource block.

In one design, UE u may determine CQI information for each of cells i and j and may report the CQI information. The reported CQI information for each cell may be dependent on the MIMO detection technique utilized by UE u, which may be zero-forcing, MMSE, MMSE with successive interference cancellation (SIC), MLD, etc. The CQI information for each cell may be quantized to K bits (e.g., K=4 bits).

In another design, UE u may determine CDI and CQI information for both cells i and j and may report the CDI and CQI information. In one design, the CDI information for each cell may be determined separately based on the channel response vector or matrix for that cell, as described above. In another design, the CDI information for both cells may be determined jointly. In any case, the CDI and CQI information for each cell may be quantized as described above.

Each cell may receive its CQI information directly from UE u or via another cell. Each cell may select an MCS based on the CQI information and may send a data stream to UE u based on the selected MCS. UE u may receive two data streams from cells i and j.

For both single-user and multi-user distributed MIMO, UE u may derive CDI and CQI information in various manners. In one design, UE u may provide wideband CDI information for each cell being reported. For example, UE u may provide a single channel vector for the entire system bandwidth for each cell and may obtain this channel vector by averaging over all subbands of interest. In another design, UE u may provide narrowband CDI information for each cell, e.g., one channel vector for each subband of interest. In general, UE u may provide any number of channel vectors for any number of subbands for each cell.

In one design, UE u may provide wideband CQI information for serving cell i, e.g., a single CQI value for the entire system bandwidth. This CQI value may be obtained by averaging over all subbands of interest. In another design, UE u may provide narrowband CQI information for serving cell i, e.g., one CQI value for each subband of interest. In general, UE u may provide any number of CQI values for any number of subbands. Serving cell i may use the CQI information for both user selection and MCS selection.

UE u may send CDI and CQI information in various manners. In one design, UE u may send CDI information for both the serving and non-serving cells at the same time. In another design, UE u may send CDI information for cells i and j in a time division multiplexed (TDM) manner to reduce uplink overhead. In one design, UE u may send CQI information whenever CDI information is sent. In another design, UE u may send CQI information at a different (e.g., slower) rate than CDI information. UE u may also send CQI and CDI information in a TDM manner to reduce uplink overhead.

UE u may send CDI and/or CQI information on various physical channels supported by the system. For LTE, UE u may be assigned resources for a Physical Uplink Control Channel (PUCCH) and/or a Physical Uplink Shared Channel (PUSCH). The PUCCH may have limited transmission capability, and UE u may be able to send a small payload (e.g., 14 bits or less) on the PUCCH in a given subframe. UE u may send feedback information comprising CDI and/or CQI information on the PUCCH if the total payload size is equal to or less than the transmission capability of the PUCCH. Otherwise, UE u may send the feedback information on the PUSCH. For example, the PUSCH may be used if the channel feedback is per subband, and UE u is reporting CQI and/or CDI information for more than one subband.

In one design, UE u may send feedback information (e.g., CDI and/or CQI information) for both cells i and j to serving cell i. Serving cell i may retain the feedback information for cell i and may forward the feedback information for cell j to cell j. In another design, UE u may send the feedback information for each cell directly to that cell.

In general, the techniques described herein may be used for any number of cells. For multi-user distributed MIMO, UE u may send CDI and CQI information to serving cell i and may (directly or indirectly) send CDI information to each non-serving cell. Each non-serving cell may select its precoding vector based on the CDI information from UE u to reduce interference to UE u. For single-user distributed MIMO, UE u may send CQI information to each cell sending data to UE u. Each cell may send one or more data streams to UE u and may process each data stream in accordance an MCS selected based on the CQI information for that cell. Each cell may also perform beamsteering if CDI information is sent by UE u.

Figures 4, 5:
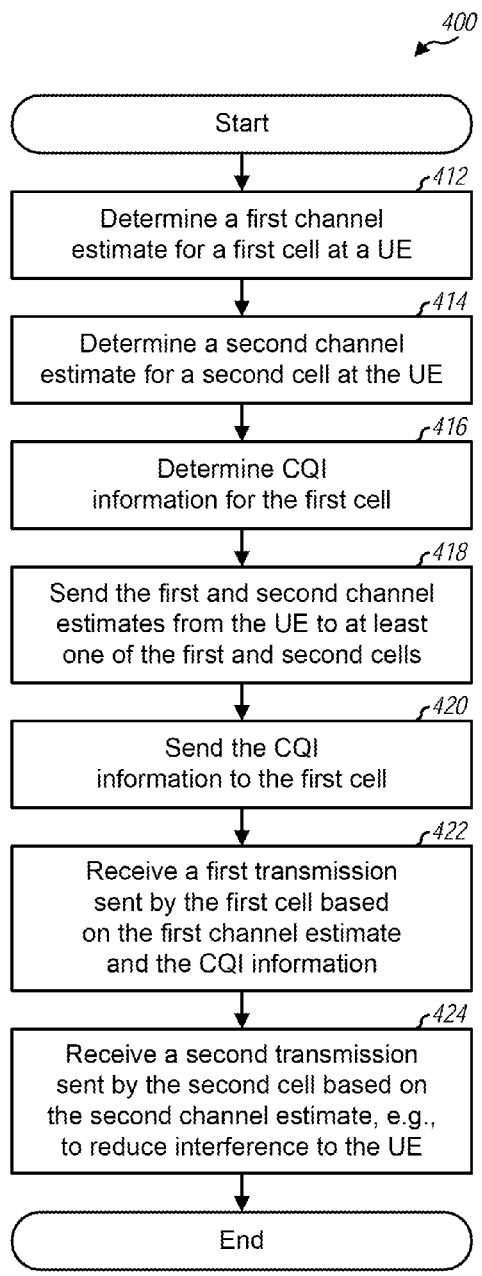
FIGS. 4 and 5 show a process and an apparatus, respectively, for receiving data with multi-user distributed MIMO.

FIG. 4 shows a design of a process 400 for receiving data in a wireless communication system. Process 400 may be performed by a UE (as described below) or by some other entity. The UE may determine a first channel estimate for a first cell, e.g., a serving cell (block 412). The UE may also determine a second channel estimate for a second cell, e.g., a non-serving cell (block 414). The first and second channel estimates may be given by channel vectors $\hat{h}_{iu}$ and $\hat{h}_{ju}$ or some other channel information. The UE may also determine CQI information for the first cell, e.g., based on the first channel estimate and the second channel estimate (block 416). The UE may send the first and second channel estimates to at least one of the first and second cells (block 418). The UE may also send the CQI information to the first cell (block 420).

The UE may thereafter receive a first transmission sent by the first cell based on the first channel estimate and the CQI information (if available) (block 422). The UE may also receive a second transmission sent by the second cell based on the second channel estimate (block 424). The first and second transmissions may be received on the same resources. The first transmission may be sent by the first cell to the UE with a first precoding vector selected based on the first channel estimate to direct transmit power of the first cell toward the UE and to improve SINR at the UE. The second transmission may be sent by the second cell to another UE with a second precoding vector selected based on the second channel estimate to reduce interference to the UE.

In one design of blocks 412 and 414, the UE may obtain a channel response vector h for each cell, e.g., based on a reference signal or pilot received from that cell. The UE may select a channel vector $\hat{h}$ from a set of channel vectors (or codebook) based on the channel response vector. Different codebooks may be used for the serving and non-serving cells. In another design of blocks 412 and 414, the UE may obtain a channel response matrix H for each cell. The UE may also determine a receive filter vector u. The UE may determine a channel response vector h for each cell based on the channel response matrix H for that cell and the receive filter vector u. The UE may then select a channel vector $\hat{h}$ from a set of channel vectors based on the channel response vector. For both designs, the UE may provide the selected channel vector $\hat{h}$ as the channel estimate for the cell.

In one design, the UE may quantize the first channel estimate with a first number of bits (e.g., B=4 bits). The UE may quantize the second channel estimate with a second number of bits (e.g., L=6 bits) greater than the first number of bits. The number of bits for each channel estimate may be dependent on the size of the codebook used to quantize that channel estimate. In one design, the UE may determine the channel estimate for the entire system bandwidth for each cell. In another design, the UE may determine the channel estimate for each of multiple subbands for each cell.

In one design of block 418, the UE may send the first channel estimate to the first cell and may send the second channel estimate to the first cell for forwarding to the second cell. In another design of block 418, the UE may send the first channel estimate to the first cell and may send the second channel estimate to the second cell. The UE may send the first and second channel estimates concurrently or with TDM.

In one design, the UE may send feedback information comprising the first and second channel estimates and the CQI information on a control channel (e.g., the PUCCH) if the total number of bits for the feedback information is equal to or less than a predetermined value. This predetermined value may be dependent on the transmission capability of the control channel. The UE may send the feedback information on a data channel (e.g., the PUSCH) if the total number of bits for the feedback information is greater than the predetermined value. The UE may also send the channel estimates and the CQI information in other manners.

FIG. 5 shows a design of an apparatus 500 for receiving data in a wireless communication system. Apparatus 500 includes a module 512 to determine a first channel estimate for a first cell at a UE, a module 514 to determine a second channel estimate for a second cell at the UE, a module 516 to determine CQI information for the first cell, e.g., based on the first channel estimate and the second channel estimate, a module 518 to send the first and second channel estimates from the UE to at least one of the first and second cells, a module 520 to send the CQI information to the first cell, a module 522 to receive a first transmission sent by the first cell based on the first channel estimate and the CQI information (if available), and a module 524 to receive a second transmission sent by the second cell based on the second channel estimate, e.g., to reduce interference to the UE.

Figures 6, 7:
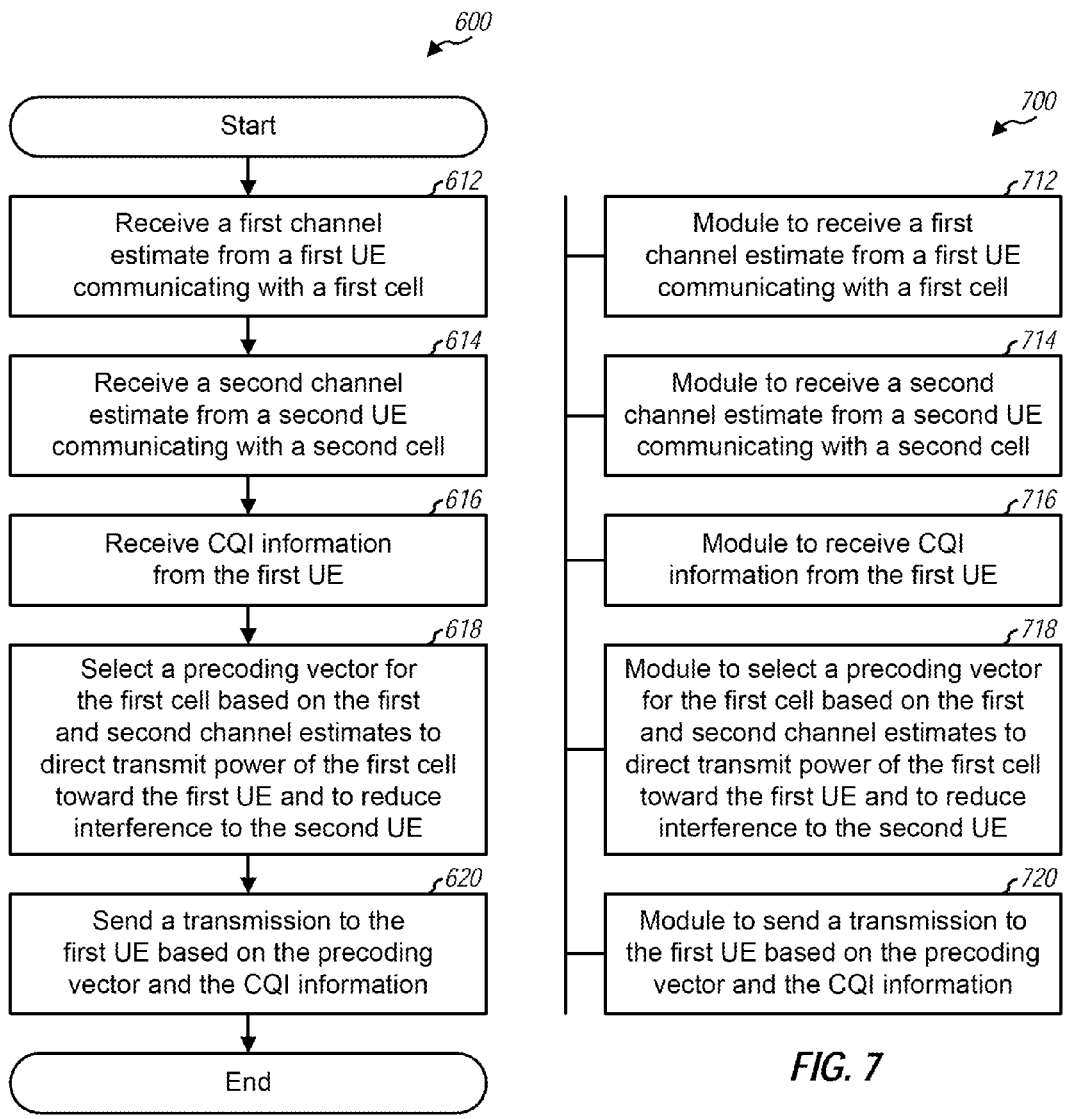
FIGS. 6 and 7 show a process and an apparatus, respectively, for sending data with multi-user distributed MIMO.

FIG. 6 shows a design of a process 600 for sending data in a wireless communication system. Process 600 may be performed by a Node B (as described below) or by some other entity. The Node B may receive a first channel estimate (e.g., $\hat{h}_{iu}$) from a first UE communicating with a first cell (block 612). The Node B may receive a second channel estimate (e.g., $\hat{h}_{jv}$) from a second UE communicating with a second cell (block 614). The Node B may also receive CQI information from the first UE (block 616). The Node B may select a precoding vector (e.g., $w_i$) for the first cell based on the first and second channel estimates to direct transmit power of the first cell toward the first UE and to reduce interference to the second UE (block 618). The Node B may send a transmission from the first cell to the first UE based on the precoding vector and the CQI information (block 620). For example, the Node B may determine an MCS based on the CQI information (if available). The Node B may then generate the transmission for the first UE based on the MCS. The Node B may also generate the transmission based on an MCS determined in other manners if the CQI information is not available.

In one design, the Node B may determine spatial orthogonality between the first and second UEs based on the first and second channel estimates. For example, the Node B may compute a metric $|\hat{h}_{jv}\hat{h}_{iu}^{H}|$, which may have a smaller value for greater spatial orthogonality, and vice versa. The Node B may select the first UE for transmission based on the spatial orthogonality between the first and second UEs.

FIG. 7 shows a design of an apparatus 700 for sending data in a wireless communication system. Apparatus 700 includes a module 712 to receive a first channel estimate from a first UE communicating with a first cell, a module 714 to receive a second channel estimate from a second UE communicating with a second cell, a module 716 to receive CQI information from the first UE, a module 718 to select a precoding vector for the first cell based on the first and second channel estimates to direct transmit power of the first cell toward the first UE and to reduce interference to the second UE, and a module 720 to send a transmission from the first cell to the first UE based on the precoding vector and the CQI information (if available).

FIG. 8 shows a design of a process 800 for receiving data in a wireless communication system. Process 800 may be performed by a UE (as described below) or by some other entity. The UE may determine first CQI information for a first cell (block 812) and may also determine second CQI information for a second cell (block 814). The first and second cells may be two cells with sufficient reference signal strength at the UE. The UE may send the first and second CQI information to at least one of the first and second cells (block 816). The UE may thereafter receive a first transmission sent by the first cell to the UE based on the first CQI information (block 818). The UE may also receive a second transmission sent by the second cell to the UE based on the second CQI information (block 820). The UE may receive the first and second transmissions concurrently on resources not used by the first and second cells for other UEs. The UE may process the first and second transmissions to obtain data sent by the first and second cells to the UE.

The UE may also determine a first channel estimate for the first cell and a second channel estimate for the second cell. The UE may send the first and second channel estimates to the first and second cells. The first transmission may then be sent by the first cell based further on the first channel estimate. The second channel estimate may be sent by the second cell based further on the second channel estimate.

In one design of block 816, the UE may send the first CQI information to the first cell and may send the second CQI information to the first cell for forwarding to the second cell. In another design of block 816, the UE may send the first CQI information to the first cell and may send the second CQI information to the second cell.

In one design, the UE may send feedback information comprising the first and second CQI information on a control channel (e.g., the PUCCH) if the total number of bits for the feedback information is equal to or less than a predetermined value. The UE may send the feedback information on a data channel (e.g., the PUSCH) if the total number of bits for the feedback information is greater than the predetermined value. The UE may also send the CQI information in other manners.

FIG. 9 shows a design of an apparatus 900 for receiving data in a wireless communication system. Apparatus 900 includes a module 912 to determine first CQI information for a first cell, a module 914 to determine second CQI information for a second cell, a module 916 to send the first and second CQI information from a UE to at least one of the first and second cells, a module 918 to receive a first transmission sent by the first cell to the UE based on the first CQI information, and a module 920 to receive a second transmission sent by the second cell to the UE based on the second CQI information.

Figures 10, 11:
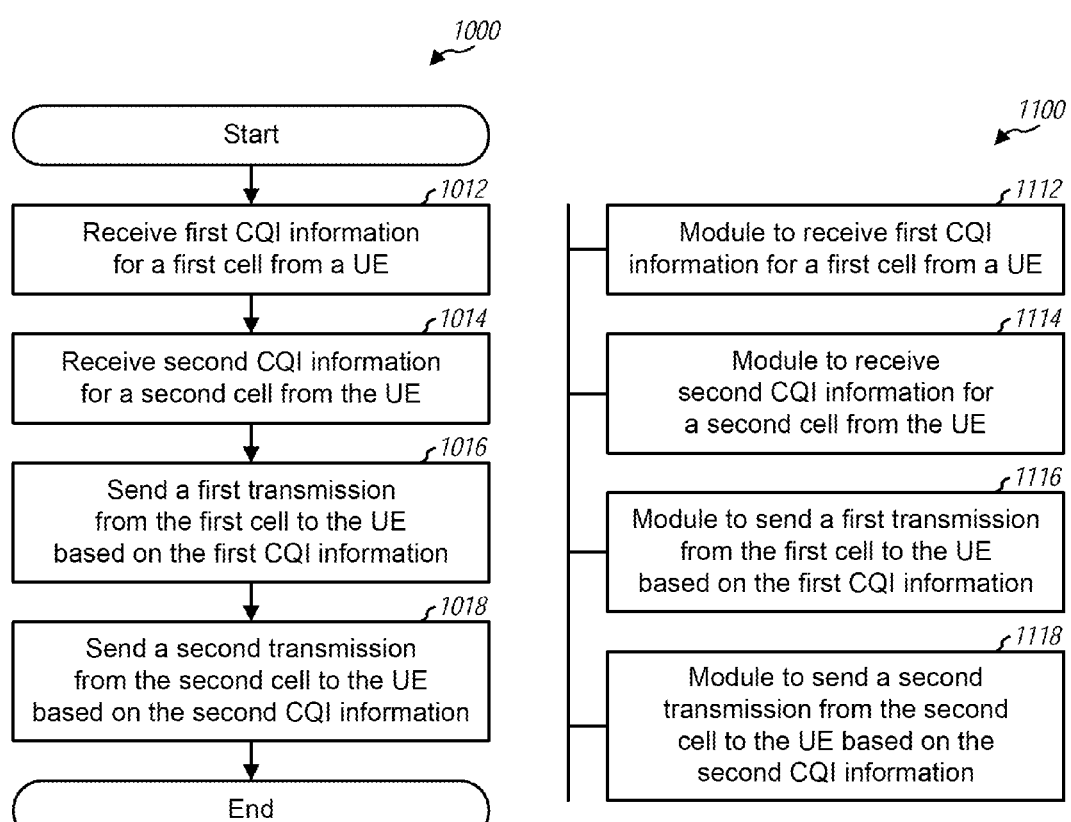
FIGS. 10 and 11 show a process and an apparatus, respectively, for sending data with single-user distributed MIMO.

FIG. 10 shows a design of a process 1000 for sending data in a wireless communication system. Process 1000 may be performed by a Node B (as described below) or by some other entity. The Node B may receive first CQI information for a first cell from a UE (block 1012) and may receive second CQI information for a second cell from the UE (block 1014). The Node B may send a first transmission from the first cell to the UE based on the first CQI information (block 1016). The Node B may send a second transmission from the second cell to the UE based on the second CQI information (block 1018). The Node B may send the first and second transmissions concurrently to the UE on resources not used by the first and second cells for other UEs.

FIG. 11 shows a design of an apparatus 1100 for sending data in a wireless communication system. Apparatus 1100 includes a module 1112 to receive first CQI information for a first cell from a UE, a module 1114 to receive second CQI information for a second cell from the UE, a module 1116 to send a first transmission from the first cell to the UE based on the first CQI information, and a module 1118 to send a second transmission from the second cell to the UE based on the second CQI information.

Figures 12, 13:
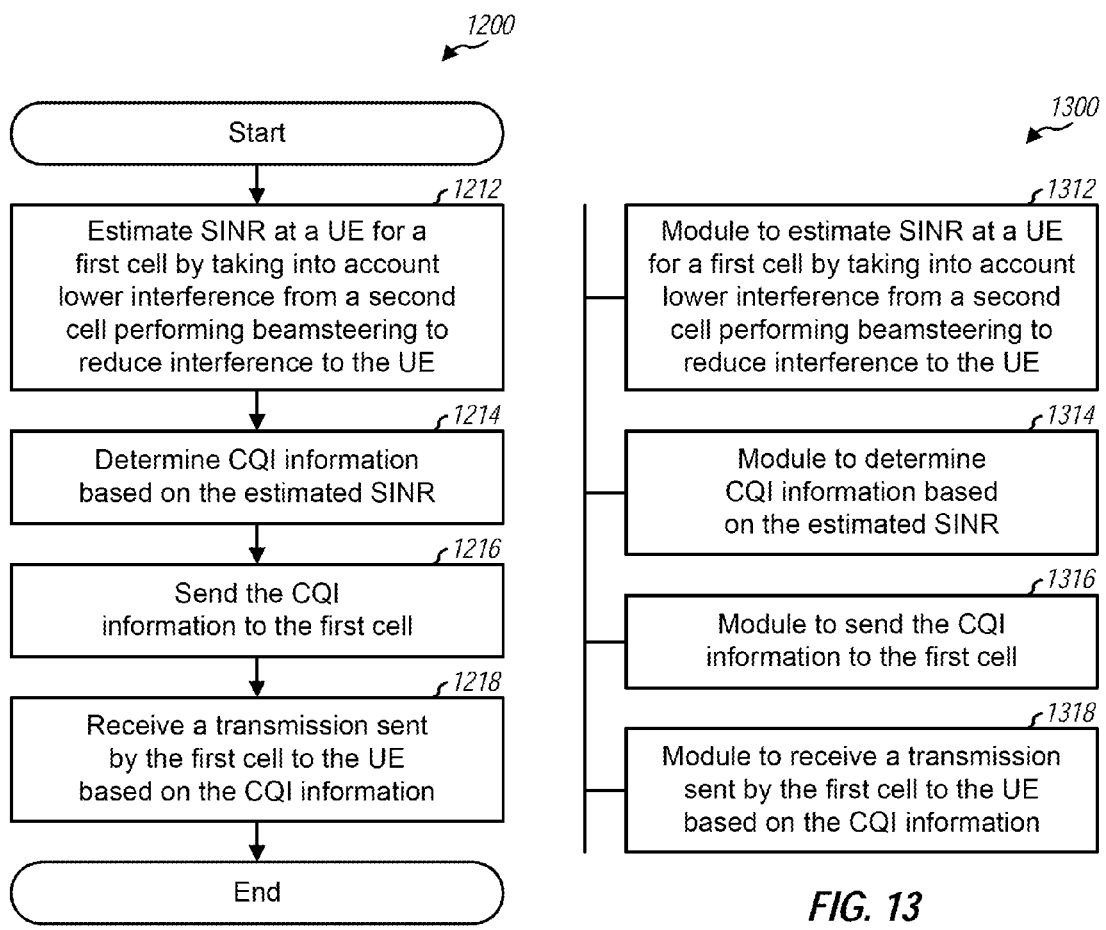
FIGS. 12 and 13 show a process and an apparatus, respectively, for determining CQI information with interference nulling.

FIG. 12 shows a design of a process 1200 for receiving data in a wireless communication system. Process 1200 may be performed by a UE (as described below) or by some other entity. The UE may estimate SINR for a first cell by taking into account lower interference from a second cell performing beamsteering to reduce interference to the UE (block 1212). The UE may determine CQI information based on the estimated SINR (block 1214) and may send the CQI information to the first cell (block 1216). The UE may thereafter receive a transmission sent by the first cell to the UE based on the CQI information (block 1218).

In one design, the UE may obtain a channel response vector h for each cell. The UE may select a channel vector ĥ from a set of channel vectors based on the channel response vector. The UE may send the selected channel vector for each cell to that cell or a designated cell. The first cell may select a first precoding vector based on its selected channel vector and may send the transmission to the UE based on the first precoding vector. The second cell may select a second precoding vector based on its selected channel vector and may perform beamforming based on the second precoding vector to reduce interference to the UE.

In one design of block 1212, the UE may determine the received power for the first cell at the UE, estimate noise at the UE, and estimate the SINR based on the received power for the first cell, the estimated noise at the UE, and an assumption of zero interference power from the second cell at the UE, e.g., as shown in equation (8) or (9). In another design of block 1212, the UE may determine the received power for the first cell at the UE, determine interference power from the second cell at the UE due to partial interference nulling by the second cell, estimate noise at the UE, and estimate the SINR based on the received power for the first cell, the interference power from the second cell, and the estimated noise at the UE, e.g., as shown in equation (14). The UE may determine an error term (e.g., $\sin^2 \theta_{ju}$) based on the channel response vector and the selected channel vector for the second cell. The UE may then determine the interference power from the second cell based on the channel response vector and the error term, e.g., as shown in equations (12) and (14).

FIG. 13 shows a design of an apparatus 1300 for receiving data in a wireless communication system. Apparatus 1300 includes a module 1312 to estimate SINR at a UE for a first cell by taking into account lower interference from a second cell performing beamsteering to reduce interference to the UE, a module 1314 to determine CQI information based on the estimated SINR, a module 1316 to send the CQI information to the first cell, and a module 1318 to receive a transmission sent by the first cell to the UE based on the CQI information.

The modules in FIGS. 5, 7, 9, 11 and 13 may comprise processors, electronics devices, hardware devices, electronics components, logical circuits, memories, software codes, firmware codes, etc., or any combination thereof.

Figure 14:
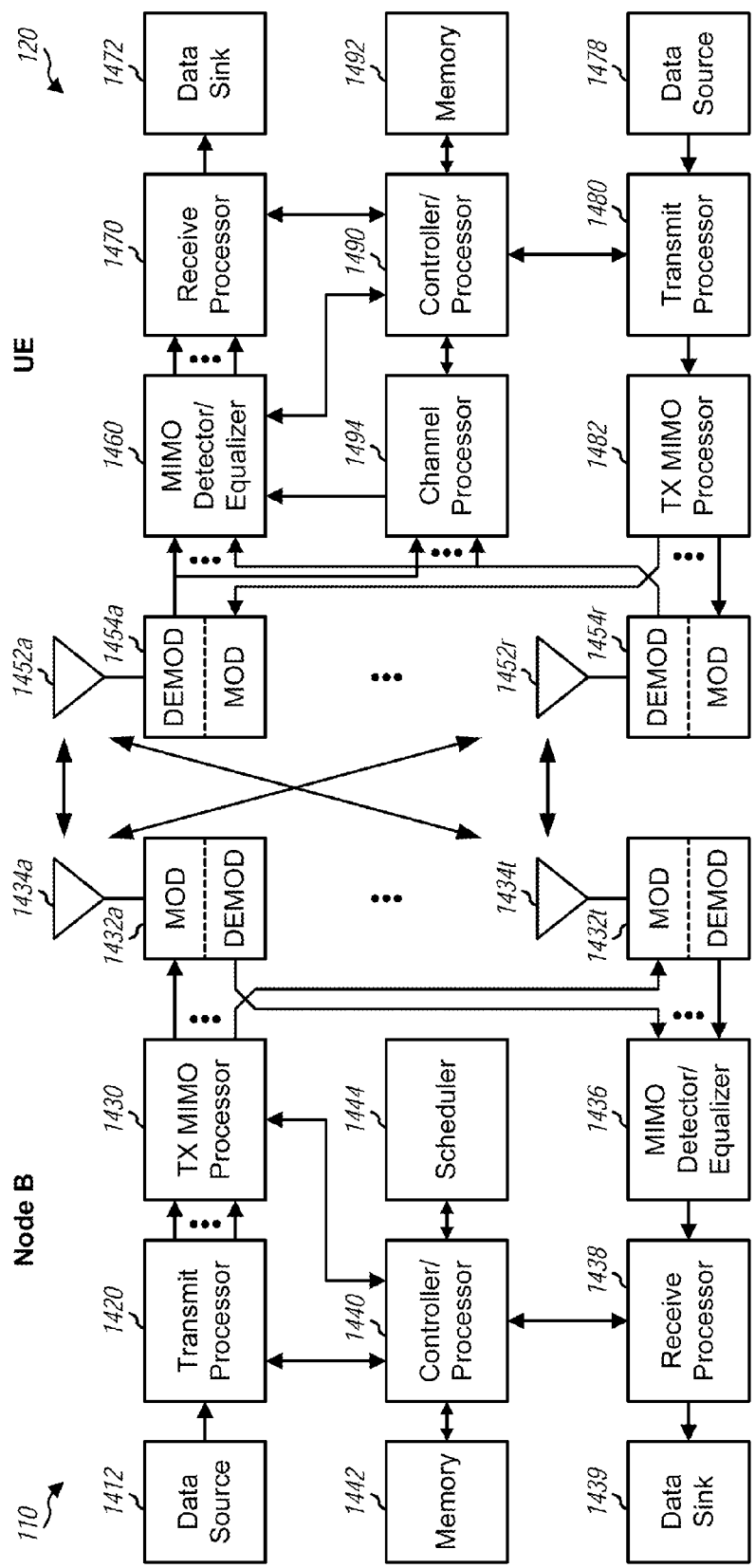
FIG. 14 shows a block diagram of a Node B and a UE.

FIG. 14 shows a block diagram of a design of a Node B 110 and a UE 120, which may be one of the Node Bs and one of the UEs in FIG. 1. Node B 110 is equipped with multiple (T) antennas 1434a through 1434t, and UE 120 is equipped with one or more (R) antennas 1452a through 1452r.

At Node B 110, a transmit processor 1420 may receive data for one or more UEs from a data source 1412, process (e.g., encode, interleave, and modulate) the data for each UE based on one or more MCS(s) selected for the UE, and provide data symbols for all UEs. Transmit processor 1420 may also receive control information from a controller/processor 1440, process the control information, and provide control symbols. Transmit processor 1420 may also generate pilot symbols for a reference signal or pilot. A transmit (TX) MIMO processor 1430 may perform preceding/beamsteering on the data symbols, control symbols, and pilot symbols and may provide T output symbol streams to T modulators (MOD) 1432a through 1432t. Each modulator 1432 may process its output symbol stream (e.g., for OFDM, etc.) to obtain an output sample stream. Each modulator 1432 may further condition (e.g., convert to analog, filter, amplify, and upconvert) its output sample stream and generate a downlink signal. T downlink signals from modulators 1432a through 1432t may be transmitted via antennas 1434a through 1434t, respectively.

At UE 120, antennas 1452a through 1452r may receive the downlink signals from Node B 110 and may provide received signals to demodulators (DEMOD) 1454a through 1454r, respectively. Each demodulator 1454 may condition (e.g., filter, amplify, downconvert, and digitize) its received signal to obtain samples and may further process the samples (e.g., for OFDM, etc.) to obtain received symbols. Each demodulator 1454 may provide received data and control symbols to a MIMO detector/equalizer 1460 and may provide received pilot symbols to a channel processor 1494. Channel processor 1494 may estimate the response of the wireless channel from Node B 110 to UE 120 based on the received pilot symbols and may provide a channel estimate for each cell of interest. MIMO detector/equalizer 1460 may perform MIMO detection/equalization on the received data and control symbols based on the channel estimates and provide detected symbols, which are estimates of the transmitted data and control symbols. A receive processor 1470 may process (e.g., demodulate, deinterleave, and decode) the detected symbols, provide decoded data to a data sink 1472, and provide decoded control information to a controller/processor 1490.

UE 120 may evaluate the channel conditions and generate feedback information, which may comprise CDI information, CQI information, and/or other information for the serving and non-serving cells. The feedback information and data from a data source 1478 may be processed by a transmit processor 1480, precoded by a TX MIMO processor 1482 (if applicable), and further processed by modulators 1454a through 1454r to generate R uplink signals, which may be transmitted via antennas 1452a through 1452r. At Node B 110, the uplink signals from UE 120 may be received by antennas 1434a through 1434t, processed by demodulators 1432a through 1432t, spatially processed by a MIMO detector/equalizer 1436, and further processed by a receive processor 1438 to recover the feedback information and data sent by UE 120. The decoded data may be provided to a data sink 1439. A controller/processor 1440 may control data transmission to UE 120 based on the decoded feedback information.

Controllers/processors 1440 and 1490 may direct the operation at Node B 110 and UE 120, respectively. Processor 1440 and/or other processors and modules at Node B 110 may perform or direct process 600 in FIG. 6, process 1000 in FIG. 10, and/or other processes for the techniques described herein. Processor 1490 and/or other processors and modules at UE 120 may perform or direct process 400 in FIG. 4, process 800 in FIG. 8, process 1200 in FIG. 12, and/or other processes for the techniques described herein. Memories 1442 and 1492 may store data and program codes for Node B 110 and UE 120, respectively. A scheduler 1444 may select UE 120 and/or other UEs for data transmission on the downlink and/or uplink based on the feedback information (e.g., CDI and CQI information) received from all UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   determining a first channel estimate for a first cell at a user equipment (UE);
   determining a second channel estimate for a second cell at the UE;
   determining channel quality indicator (CQI) information for the first cell;
   quantizing the first channel estimate with a first number of bits;
   quantizing the second channel estimate with a second number of bits greater than the first number of bits;
   sending the first and second channel estimates from the UE to at least one of the first and second cells;
   sending the CQI information to the first cell;
   receiving a first transmission sent by the first cell based on the first channel estimate and the CQI information; and
   receiving a second transmission sent by the second cell based on the second channel estimate, wherein the first and second transmissions are received on same resources.

2. The method of claim 1, wherein the first transmission is sent by the first cell to the UE, and wherein the second transmission is sent by the second cell based on the second channel estimate to reduce interference to the UE.

3. The method of claim 1, wherein the determining the first channel estimate for the first cell comprises
   obtaining a channel response vector for the first cell,
   selecting a channel vector from a set of channel vectors based on the channel response vector, and
   providing the selected channel vector as the first channel estimate.

4. The method of claim 3, wherein the obtaining a channel response vector for the first cell comprises
   obtaining a channel response matrix for the first cell,
   determining a receive filter vector for the UE, and
   determining the channel response vector for the first cell based on the channel response matrix and the receive filter vector.

5. The method of claim 1, wherein the first channel estimate for the first cell is determined for each of multiple subbands and sent to the first cell.

6. The method of claim 1, wherein the sending the first and second channel estimates comprises
   sending the first channel estimate to the first cell, and
   sending the second channel estimate to the first cell for forwarding to the second cell.

7. The method of claim 1, wherein the sending the first and second channel estimates comprises
   sending the first channel estimate to the first cell, and
   sending the second channel estimate to the second cell.

8. The method of claim 1, wherein the sending the first and second channel estimates comprises
   sending feedback information comprising the first and second channel estimates on a control channel if a total number of bits for the feedback information is equal to or less than a predetermined value, and
   sending the feedback information on a data channel if the total number of bits for the feedback information is greater than the predetermined value.

9. The method of claim 1, wherein the sending the first and second channel estimates comprises sending the first and second channel estimates with time division multiplexing (TDM).

10. An apparatus for wireless communication, comprising:
    means for determining a first channel estimate for a first cell at a user equipment (UE);
    means for determining a second channel estimate for a second cell at the UE;
    means for determining channel quality indicator (CQI) information for the first cell;
    means for quantizing the first channel estimate with a first number of bits;
    means for quantizing the second channel estimate with a second number of bits greater than the first number of bits;
    means for sending the first and second channel estimates from the UE to the first and second cells;
    means for sending the CQI information to the first cell;
    means for receiving a first transmission sent by the first cell based on the first channel estimate and the CQI information; and
    means for receiving a second transmission sent by the second cell based on the second channel estimate.

11. The apparatus of claim 10, wherein the means for determining the first channel estimate for the first cell comprises
    means for obtaining a channel response vector for the first cell,
    means for selecting a channel vector from a set of channel vectors based on the channel response vector, and means for providing the selected channel vector as the first channel estimate.

12. The apparatus of claim 10, wherein the means for sending the first and second channel estimates comprises
means for sending feedback information comprising the first and second channel estimates on a control channel if a total number of bits for the feedback information is equal to or less than a predetermined value, and
means for sending the feedback information on a data channel if the total number of bits for the feedback information is greater than the predetermined value.

13. An apparatus for wireless communication, comprising:
at least one processor configured to determine a first channel estimate for a first cell at a user equipment (UE), to determine a second channel estimate for a second cell at the UE, to determine channel quality indicator (CQI) information for the first cell, to quantize the first channel estimate with a first number of bits, to quantize the second channel estimate with a second number of bits greater than the first number of bits, to send the first and second channel estimates from the UE to the first and second cells, to send the CQI information to the first cell, to receive a first transmission sent by the first cell based on the first channel estimate and the CQI information, and to receive a second transmission sent by the second cell based on the second channel estimate.

14. The apparatus of claim 13, wherein the at least one processor is configured to determine channel quality indicator (CQI) information for the first cell, to send the CQI information to the first cell, and to receive the first transmission sent by the first cell based further on the CQI information.

15. The apparatus of claim 13, wherein the at least one processor is configured to obtain a channel response vector for the first cell, to select a channel vector from a set of channel vectors based on the channel response vector, and to provide the selected channel vector as the first channel estimate.

16. The apparatus of claim 13, wherein the at least one processor is configured to send feedback information comprising the first and second channel estimates on a control channel if a total number of bits for the feedback information is equal to or less than a predetermined value, and to send the feedback information on a data channel if the total number of bits for the feedback information is greater than the predetermined value.

17. A computer program product stored on a non-transitory, computer-readable medium comprising:
code for causing at least one computer to determine a first channel estimate for a first cell at a user equipment (UE),
code for causing the at least one computer to determine a second channel estimate for a second cell at the UE,
code for determining channel quality indicator (CQI) information for the first cell,
code for quantizing the first channel estimate with a first number of bits,
code for quantizing the second channel estimate with a second number of bits greater than the first number of bits,
code for causing the at least one computer to send the first and second channel estimates from the UE to the first and second cells,
code for causing the at least one computer to send the CQI information to the first cell,
code for causing the at least one computer to receive a first transmission sent by the first cell based on the first channel estimate and the CQI information, and
code for causing the at least one computer to receive a second transmission sent by the second cell based on the second channel estimate.

18. A method for wireless communication, comprising:
determining first channel quality indicator (CQI) information for a first cell;
determining second CQI information for a second cell;
quantizing the first CQI information with a first number of bits;
quantizing the second CQI information with a second number of bits greater than the first number of bits;
sending the first and second CQI information from a user equipment (UE) to at least one of the first and second cells;
receiving a first transmission sent by the first cell to the UE based on the first CQI information; and
receiving a second transmission sent by the second cell to the UE based on the second CQI information.

19. The method of claim 18, further comprising:
determining a first channel estimate for the first cell, wherein the first transmission is sent by the first cell based further on the first channel estimate; and
determining a second channel estimate for the second cell, wherein the second transmission is sent by the second cell based further on the second channel estimate.

20. The method of claim 18, wherein the first and second transmissions are received concurrently by the UE on resources not used by the first and second cells for other UEs.

21. The method of claim 18, wherein the sending the first and second CQI information comprises
sending the first CQI information to the first cell, and
sending the second CQI information to the first cell for forwarding to the second cell.

22. The method of claim 18, wherein the sending the first and second CQI information comprises
sending the first CQI information to the first cell, and
sending the second CQI information to the second cell.

23. The method of claim 18, wherein the sending the first and second CQI information comprises sending feedback information comprising the first and second CQI information on a control channel if a total number of bits for the feedback information is equal to or less than a predetermined value, and sending the feedback information on a data channel if the total number of bits for the feedback information is greater than the predetermined value.

24. An apparatus for wireless communication, comprising:
means for determining first channel quality indicator (CQI) information for a first cell;
means for determining second CQI information for a second cell;
means for quantizing the first CQI information with a first number of bits;
means for quantizing the second CQI information with a second number of bits greater than the first number of bits;
means for sending the first and second CQI information from a user equipment (UE) to at least one of the first and second cells;
means for receiving a first transmission sent by the first cell to the UE based on the first CQI information; and
means for receiving a second transmission sent by the second cell to the UE based on the second CQI information.

25. The apparatus of claim 24, wherein the means for sending the first and second CQI information comprises:
means for sending feedback information comprising the first and second CQI information on a control channel if total number of bits for the feedback information is equal to or less than a predetermined value, and means for sending the feedback information on a data channel if the total number of bits for the feedback information is greater than the predetermined value.

26. A method for wireless communication, comprising:

receiving first channel quality indicator (CQI) information for a first cell from a user equipment (UE), wherein the first CQI information comprises a first number of bits;

receiving second CQI information for a second cell from the UE, wherein the second CQI information comprises a second number of bits greater than the first number of bits;

sending a first transmission from the first cell to the UE based on the first CQI information; and sending a second transmission from the second cell to the UE based on the second CQI information.

27. The method of claim 26, wherein the first and second transmissions are sent concurrently to the UE on resources not used by the first and second cells for other UEs.

28. An apparatus for wireless communication, comprising:

means for receiving first channel quality indicator (CQI) information for a first cell from a user equipment (UE), wherein the first CQI information comprises a first number of bits;

means for receiving second CQI information for a second cell from the UE, wherein the second CQI information comprises a second number of bits greater than the first number of bits;

means for sending a first transmission from the first cell to the UE based on the first CQI information; and means for sending a second transmission from the second cell to the UE based on the second CQI information.

* * * * *